ary Wong, Jr.
United States Patent [19]
Jandourek

[11] 3,872,047
[45] Mar. 18, 1975

[54] COMPOSITION AND METHOD FOR IMPROVING ADHERENCE OF POLYMERIC MATERIALS TO SUBSTRATES

[76] Inventor: Hana Jandourek, 4475 Jonathon Ave., Dearborn, Mich. 48126

[22] Filed: Dec. 4, 1972

[21] Appl. No.: 311,788

[52] U.S. Cl. .............................. 260/33.4 R, 260/885
[51] Int. Cl. ......................... C08f 45/32, C08f 15/36
[58] Field of Search .............. 260/80 P, 33.4 R, 885

[56] References Cited
UNITED STATES PATENTS

| | | | |
|---|---|---|---|
| 3,317,635 | 5/1967 | Osmond | 260/885 |
| 3,382,297 | 5/1968 | Thompson | 260/885 |
| 3,528,844 | 9/1970 | Burlant et al. | 260/885 |
| 3,730,888 | 5/1973 | Buckman et al. | 260/80 P |

FOREIGN PATENTS OR APPLICATIONS

| | | |
|---|---|---|
| 485,784 | 2/1970 | Switzerland |
| 1,466,823 | 1/1967 | France |

OTHER PUBLICATIONS
Chemical Abstracts, Volume 74: 5533 S.

*Primary Examiner*—Harry Wong, Jr.
*Assistant Examiner*—S. L. Fox
*Attorney, Agent, or Firm*—Theodore B. Roessel; John E. Vanderburgh; Roger Aceto

[57] ABSTRACT

A primer composition and method for improving adhesion of polymeric material to metal ion containing substrate is provided. The primer consists of a solution of a polymer whose chain contains polar groups, such as carboxy, hydroxy, groups and the like, and non-polar monoethylenically unsaturated terminal groups. The primer is applied to the surface to be treated, the solvent evaporated and the polymeric material applied and cured in the usual way. The bond tensile strength of samples employing the primer composition is substantially increased as compared to the bond tensile strength of samples not employing the primer composition of this invention.

3 Claims, No Drawings

COMPOSITION AND METHOD FOR IMPROVING ADHERENCE OF POLYMERIC MATERIALS TO SUBSTRATES

FIELD OF INVENTION

This invention relates to a composition and method for improving the adhesion of polymeric materials to metal ion containing substrates.

BACKGROUND OF THE INVENTION

Various polymeric materials are available which when employed as adhesive or restorative materials can be rapidly cured to form tough water resistant bonds or restorations. Many uses for such materials are known such as in bonding wood-to-wood and wood-to-metal. The bonding of glass, metal and various plastic compositions have also been achieved by such compositions. In the medical and dental health fields polymeric adhesive and restorative materials have found wide application, particularly because of the improved appearance of the finished bond or restoration as contrasted to mercury-silver amalgams, gold, silver and the like.

Often times, however, the bond between the polymeric material and the substrate has been found to be lacking in sufficient strength due to lack of adequate bonding between the polymeric material and the substrate. Thus, in the bonding of a polymeric material to substrates containing calcium, gold, iron, silver and other metals and alloys thereof there is normally required a mechanical interlock to insure retention of the polymeric material in bond with the substrate. For example, in the restoration of a tooth cavity where the substrate contains calcium, the area adjacent the cavity must be undercut so as to provide a mechanical interlock for the restorative material. Such undercutting requires the removal of excess healthy tooth structure and the resulting restoration is subject to further decay due to the penetration of bacteria through the interface between the tooth and the restorative material.

Likewise, in dentistry and in other fields it is important to form a good bond between a polymeric material and metal and metal alloy substrates such as gold, silver, stainless steel brass and the like, for example in anchoring retaining pins, bonding restorative materials to mercury-silver or gold restorations and the like.

Accordingly, it is an object of this invention to provide a polymeric primer composition which, when applied to the metal ion containing substrate at the interface between the substrate and the polymeric material, will appreciably aid in bonding the polymeric material to the substrate.

It is another object of this invention to provide a method for improving the bond between polymeric materials and metal ion containing substrates.

Another object of this invention is to provide a composition and method for use in restorative procedures and for the fixing of orthodontic appliances to external tooth surface and the like which provides water resistant adhesion between the substrate and restorative material or bonding material for orthodontic devices whereby the amount of healthy tooth, bone and gingivial structure required to be removed during the restorative procedure is reduced to a minimum.

Other objects and advantages of this invention will become apparent from a consideration of the following description and the novel features thereof will particularly pointed out hereinafter in connection with the appended claims.

SUMMARY OF THE INVENTION

The foregoing objects and advantages are accomplished by the composition of this invention which comprises solublized polymeric material comprising polymer chains characterized by containing high polar, hydrophillic groups and low polar hydrophobic groups which are in a reactive condition as will be described hereinafter.

In the use of the composition of this invention, the surface to which is to be bonded restorative material is first cleaned, either mechanically, chemically or both and is treated with the polymeric composition of this invention to prepare the surface for bonding. Following surface preparation, the restorative material is applied and allowed to harden under conditions ordinarily specified for the particular restorative material used.

Although it is not completely understood, it is believed that the polar hydrophillic groups of the polymeric compositions are oriented towards and are reactive with the metal containing material of the substrate. The non-polar hydrophobic groups of the polymeric composition are reactive, such as by free radical initiation, so as to polymerize with the restorative material thereby providing a chemical bond of the restorative material to the substrate surface.

DESCRIPTION OF THE INVENTION

The following description will be confined primarily to dental restoration involving the bonding of polymeric restorative material to calcareous substrates since it is primarily in this area that the use of restorative resin and the like has been made to repair and rebuild bone and tooth structure. However, it should be clear that, with modifications which will be obvious after a review of the specification, the composition and method of this invention will be equally applicable to the repair of bone fractures and the like in other areas of the human or animal body. Likewise, the composition and method of this invention is applicable to bonding polymeric materials to non-living metal ion containing substrates. Metal ion containing substrates as used herein means any substrate composed, in whole or in part, of metallic ion such as for example, calcium, gold, silver, iron, copper, tin and alloys and compositions thereof.

Polymeric dental restorative resins at the present time consist of three mainly used groups; methacrylate filling resins, composite materials, and polyester filling materials.

The methacrylate filling resins normally consist of a polymeric phase and a monomers phase of methacrylate monomer with or without lesser amounts of other compactable monomeric material and normally a polymerization activator. The polymeric phase consists of polymeric powder with or without filler and containing suitable peroxide initiator. The polymeric and monomers phases are mixed together to produce a slurry, which has a built-in free radical polymerization system providing the polymerization of the material in the dental cavity.

The composite restorative materials are based on the polymerization of high molecular weight dimethacrylate or diacrylate monomers such as described in U.S. Pat. Nos. 3,066,112 and 3,179,623. These materials are highly filled for the purpose of improving physical and chemical properties of the restorative material and for color matching the material with the tooth structure.

The third group comprises the polyester filling materials which consist of polyester resins with or without fillers such as silica and which contain reactive monomers as diluents and free radical polymerization intiators. These materials also contain suitable peroxide and polymerization accelerators.

As has been pointed out, the three main groups of polymeric restorative materials will not form good bonds with the calcium ion containing tooth structure and as a result the restoration is subject to leaking at the interface between the restorative material and the tooth structure which results in secondary decay. Also, the tooth structure must be prepared for mechanical interlock which results in the removal of excess healthy tooth or bone structure.

The composition of this invention is used with any of the three abovementioned groups of restorative materials as well as with other resins, which are characterized by being polymerized by free radical polymerization.

The composition of this invention comprises a solubilized polymeric material, the structure of which is characterized by containing polar hydrophillic reactive groups which are capable of interacting with the metal ion containing substrate, in the case of dental restoration a calcareous substrate, and low polar hydrophobic reactive groups which are capable of polymerizing by free radical polymerization with the restorative material. For medical and dental work the polymeric composition of this invention must be harmless to tooth, bone, or other tissue in the area of use.

The chemical composition of the main chain or "backbone" of the polymer is not considered critical and a wide variety of ethylenically unsaturated monomers can be employed in producing the polymer. The polymeric composition of this invention can be formed by the polymerization of ethylenically unsaturated monomers such as, for example, as acrylic acid, methacrylic acid, maleic anhydride, maleic acid, itaconic acid, 2-sulfoethylmethacrylate, glycidyl methacrylate, glycidyl acrylate, fumaric acid, citraconic acid, crotonic acid, and vinyl benzyl sulfonic acid. In addition the polymer may be formed by the polymerization of the aforementioned monomers with one or more ethylenically unsaturated monomers such as styrene, vinylacetate, vinylpyridine, vinylpyrolidone, vinyl carbazide, vinyl chloride, vinyl carbazol, vinylidine chloride, vinyl toluene, acrylonitrile, methacrylonitrile, acrylamide, methacrylamide, allylacrylate, allylmethacrylate, glycidylmethacrylate, vinylsulfonic acid, 2-sulfoethylmethacrylate, glycerine phosphoric acid, diethylaminoethylmethacrylate methacrylate, methacryloxyethyl phosphate, diacetone acrylamide, N-methacryloxy-o-amino phenol and substituted or unsubstituted esters of acrylic and methacrylic acids and the like.

The polymer composition is characterized by the presence of a low polar, hydrophobic, monoethylenically unsaturated group of the general formula:

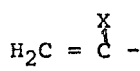

Where X is hydrogen or a group selected from the halogen, alkyl, alkoxy or cyano groups.

This group, which is located in a terminal position in the polymer structure polymerizes with the polymeric bonding or restorative material by free radical, cationic or anionic polymerization mechanisms practiced in the polymerization art to chemically unite the restorative material with the polymer of the composition of this invention. The term "reactive" as applied to the low polar, hydrophobic groups means the ability of the groups to polymerize with the restorative material as described above.

Additionally, the polymer chain is characterized by one or more surface active, polar, hydrophillic groups along the chain or side chains. Such groups include for example the hydroxyl, the carboxyl, the epoxy, the sulphonic, sulphinic, thiol, phosphoric, nitrilo, aziridino, isocyanate and the substituted or unsubstituted amino, imino, amido and imido, groups and combinations thereof. More than one species of the surface active group can be incorporated into the polymer structure with good results.

Such groups are surface active with respect to metal ion containing substrates, that is to say such groups will wet the surface of the substrate and, although it is not fully understood, it is believed that the surface active groups promote adhesion by forming ionic bonds or chelates with the metal ions of the substrate surface or by providing hydrogen bonds between the substrate and polymer. Such surface activity in any event results in the bonding of surface active groups of the polymer chain to the substrate surface.

The polymer of the composition of this invention may be prepared in one or more stages by methods generally practiced in the art. It is preferred to use suspension polymerization techniques employing free radical polymerization mechanism to effect polymerization and in this connection any free radical initiator may be used such as for example; peroxide, hydroperoxides, acyl peroxides, azo compounds, redox initiators and the like. Other methods of initiating free radical polymerization can be employed, such as ultraviolet radiation or irradiation with ionizing rays.

As mentioned above, the polymer may be formed in one stage such as the copolymerization of a monomer or monomers carrying the low polar group in the presence of a monomer or monomers carrying the surface active groups or in two or more stages such as by forming a backbone polymer chain and by grafting side chains or branches containing low polar reactive or surface active groups thereon. In addition surface active groups may be formed on a polymer chain by subsequent chemical reaction such as hydrolysis, polymer sulfonation, oxidation, nitration, amination and the like by methods well-known in the art.

The solvent employed as the polymer vehicle in the composition of this invention must necessarily be able to wet the surface of the substrate being treated. Likewise, the solvent must be fugitive, that is to say after having performed its function as a vehicle for the polymer solubilized therein, it should disappear from the site being treated without leaving a residue which will interfere with the action of the polymer or which would otherwise have a deleterious effect on the bond, or restoration, the substrate surface or the environment in which the bond or restoration is located. The solvent, of course, must be capable of solubilizing at least small quantities of the polymer composition. With the foregoing parameters in mind, the solvent is characterized as being polar and having a boiling point between about 50°C to about 150°C. When employed as a primer for improvement of adhesion for medical, dental or veterinary purposes it is preferred that the solvent be of low toxicity, even though fugitive.

The solvent must be polar to enable it to wet a metal ion containing substrate so as to secure intimate contact between the polymer and the substrate surface.

In the preferred embodiment, the solvent is removed from the site of restoration or bonding by evaporation, such as, for example, in a stream of air since a dry substrate surface is highly preferred. However, it is desirable that the solvent not evaporate at an excessive rate so that there is sufficient time for the polymer to contact the substrate surface. It has been found that, for the purposes of this invention, there is sufficient relationship between solvent boiling point and its rate of evaporation at atmospheric pressure to determine from its boiling point whether a solvent is suitable for use. Thus, polar solvents having a boiling point between about 50°C. and 150°C. possess evaporation rates that are satisfactory for use in this invention.

Among the preferred solvents for use in dental applications are ethanol, propanol and butanol as these are polar, non-toxic, non-irritating to tooth and gum tissue and will solubilize the polymer composition. It should be clear, however, that in other applications other polar alcohols, ethers, esters and ketones meeting the foregoing criteria are used with good results.

The concentration of polymer in the composition of this invention is not critical and will be largely dependant upon the nature of the solvent, the solubility of the polymer therein and the nature of the substrate being treated. As will be shown, concentration ranges of between 0.0625 to 10 percent by weight of polymer in the primer composition are effective for promoting adhesion of polymeric restorative materials to calcareous substrates.

The following examples illustrate the production and use of the product of this invention as applied to the repair and restoration of calcareous substrates. The invention, however, is not to be construed as being limited to the particular composition or manner of use set forth in the examples.

EXAMPLE 1

The following example illustrates a preferred method for producing a polymer composition for use in the product of this invention.

PREPARATION OF POLYMER CHAIN

Into 85 ml. of benzene was dissolved 0.75 g. azobisisobutyronitrile and .75 g. dodecylmercaptane. This solution was heated to a temperature of 80°C and 25 g. of acrylic acid was gradually added. During the addition polyacrylic acid precipitated in the form of a fine white powder from the reaction mixture. The reaction mixture was held at a temperature of 80°C for an additional 60 minutes after the last addition of acrylic acid in order to complete the polymerization reaction.

The precipitated polyacrylic acid was decanted five times with 50 ml benzene to purify the polymer and the remaining benzene and last traces of initiator were removed by heating the polymer to approximately 90°C for 48 hours.

The polyacrylic acid chain carries carboxylic groups which constitute the polar surface active groups of the polymer composition and also provide reactive sites for the grafting polymerization reaction.

GRAFTING ON OF LOW POLAR REACTIVE GROUPS

Introduction of the hydrophobic low polar groups into the polyacrylic acid chain was accomplished by forming a graft copolymer of the polyacrylic acid and glycidylmethacrylate in the following manner.

A 40 weight percent solution of the polyacrylic acid in butanol was prepared. Ten samples, 18 grams each, of the solution containing 7.2 g. (0.1 mol) of the polyacrylic acid were placed in ten 50 ml polyethylene bottles. Commercially available glycidylmethacrylate was added to each bottle as follows:

| Sample No. | 1 | .01 | mol |
| Sample No. | 2 | .02 | mol |
| Sample No. | 3 | .03 | mol |
| Sample No. | 4 | .04 | mol |
| Sample No. | 5 | .05 | mol |
| Sample No. | 6 | .06 | mol |
| Sample No. | 7 | .07 | mol |
| Sample No. | 8 | .08 | mol |
| Sample No. | 9 | .09 | mol |
| Sample No. | 10 | 0.1 | mol |

The reaction mixtures were homogenized with intensive stirring and held at approximately 60°C until a test for epoxide indicated all the available epoxide had reacted.

A complex infrared adsorption spectrum of Sample No. 10 when compared to the starting materials, was an agreement with the reaction shown in below:

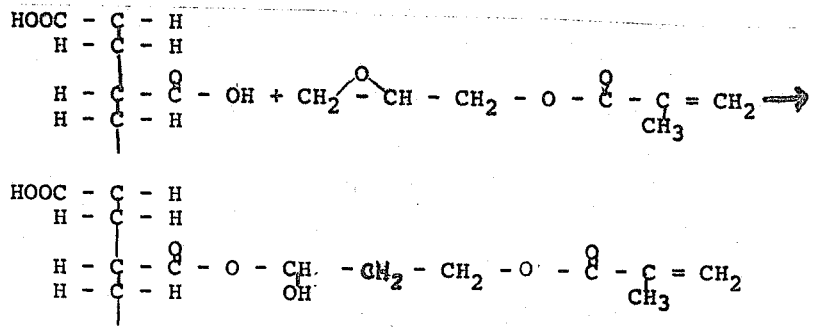

The finished polymer composition was purified by three reprecipitations in benzene/methanol system. The purified polymer was dissolved in n-butanol in sufficient concentration to form a 2 percent solution of polymer in n-butanol.

The polar hydrophillic groups of the polymer are unreacted COOH radicals available on the polyacrylic chain and the hydroxyl groups formed by the reaction between the carboxyl and epoxy groups of the glycidylmethacrylate during the graft polymeriation reaction. The low polar hydrophic group is the methacrylate group in a terminal position on the grafted glycidyl methacrylate.

EXAMPLE II

The primer compositions comprising the 2 percent solutions of the polymer prepared in Example 1 above were tested for adhesion improvement properties on bovine teeth according to the following method.

Each tooth tested was partially embedded in an orthodontic grade resin block and a test surface consisting of a circular button of approximately 6 mm in diameter was prepared on a flat upper surface of the tooth by grinding away tooth enamel surrounding the selected test surface. The surface of the button was ground to improve flatness and slightly polished with 400 grit wet abrasive paper.

The surface was cleaned with one drop of 20 percent aqueous lactic acid solution and rinsed with tap water after one minute contact with the lactic acid solution. The surface was then dried with a stream of air.

One drop of primer solution prepared in Example 1 was placed on the button surface for one minute after which time excess primer solution was blown off and the surface dried with a stream of air for approximately 15 seconds.

The tooth was placed in a holding fixture provided with an opening larger than the test surface and the tooth positioned in the fixture so that the test surface was aligned with the fixture opening. A hollow polytetrafluoroethylene retaining sleeve having an outside diameter corresponding to the fixture opening and an inside diameter of 3 mm. was inserted in the fixture with its lower end abutting against the test surface.

A direct filling dental restorative material, the polymeric portion of which consisted of the reaction product of a glycidyl ether of a polyhydric phenol and methacrylate acid and a major portion of which consisted of fused silica filler, was placed in the sleeve and tamped to insure intimate contact between restorative material and the test surface.

A brass cylinder approximately 3 mm in diameter having an upper end adapted for clamping in an Instron tensile test machine and a lower end provided with an inverted conical extension 1 mm in diameter at its widest point, was inserted in the sleeve containing restorative material. A 500 gram weight was placed on the brass cylinder to insure good contact between the primer tooth surface and the restorative material and to allow the restorative material to cure under pressure. In addition, the weight insured penetration of the restorative material by the conical extension to provide a bond of the brass cylinder to the restorative material for testing purposes. After fifteen minutes of cure the tooth and bonded cylinder were removed from the fixture, the retaining sleeve removed and the bonded assembly placed in water at 37°C for one week prior to the tensile test.

The tensile tests were conducted on an Instron tensile test machine at a rate of 0.02 inch/min and care was exercised throughout the procedure to insure that the tooth sample and brass cylinder were aligned so that the pull of the tensile test machine was axial through the bond area.

Load was applied until a fracture occurred and the load in kg/cm² at the time of fracture was recorded.

The foregoing procedure was followed for each of samples 1–10 and 10 specimens of each sample were run to determine the mean tensile strength of the bonds formed using each of samples 1–10. In addition 10 specimans were prepared using no primer composition and 10 specimens were prepared which had been treated with a primer consisting of 2 percent by weight of polyacrylic acid prepared as in Example 1 but without the grafting of glycidylmethacrylate. The results are summarized in Table A below:

TABLE A

| Sample | Tensile Strength kg/cm² |
| --- | --- |
| No Primer | 72.9 |
| Polyacrylic acid | 35.6 |
| 1 | 107.2 |
| 2 | 108.0 |
| 3 | 148.9 |
| 4 | 184.7 |
| 5 | 180.4 |
| 6 | 185.2 |
| 7 | 217.2 |
| 8 | 189.6 |
| 9 | 167.3 |
| 10 | 191.8 |

From the foregoing results it will be seen that there is a definite increase in bond strength when the primer composition of this invention is employed prior to the introduction of the restorative material. Beginning with the composition of sample 3 it will be noted that bond strength is double the bond strength of restorative material to tooth structure alone. In the tests conducted where sample 7 was employed as the primer, 7 of 10 specimens fractured at the restorative material which when tested by the method of this Example was found to have a tensile strength of about 219 kg/cm².

Likewise, when samples employing the primer composition of this invention are subjected to 70 cycles of 4°C water to boiling water, the bond remains firm and cannot be fractured by hand. Contrasted to this, samples where the bond surface is not first treated with the primer composition of this invention exhibit weak bonds readily destroyed by hand when subjected to the same cycles of cold and hot water.

EXAMPLE III

The following example illustrates the noncriticality of polymer concentration in the primer of this invention.

Primers of varying polymer concentration were prepared using Sample No. 9 of Example 1 and using n-butanol as the solvent. Samples were prepared ranging between 10 percent by weight of polymer concentration to 0.0625 weight percent. The various primer samples were tested in the manner of Example II and the specimens subjected to tensile testing in the manner of Example II. The results are summarized in Table B below:

TABLE B

| Polymer Concentration, Primer/Weight Percent | Tensile Strength kg/cm² |
| --- | --- |
| .0265 | 201.9 |
| .125 | 187.1 |
| .25 | 160.9 |
| .5 | 132.7 |
| 1 | 187.1 |
| 5 | 189.7 |
| 10 | 187.5 |

Taking into account variables normally encountered in tests of this type, it can be seen that there is no substantial difference in the tensile strength of specimens where they have been pre-treated in accordance with this invention with primers of varying polymer concentration.

EXAMPLE IV

The following example is directed to a primer compositions incorporating as the polymer composition having sulfonic groups as the surface reactive hydrophillic group.

Preparation of Polymer Chain

Samples 11 – 15 were prepared in accordance with the following monomers composition table.

| Sample | Sulfoethyl-methacrylate weight percent | Sulfoethyl-methacrylate grams | Acrylic acid grams |
|---|---|---|---|
| 11 | 2 | .4 | 19.6 |
| 12 | 4 | .8 | 19.2 |
| 13 | 8 | 1.6 | 18.4 |
| 14 | 12 | 2.4 | 17.6 |
| 15 | 16 | 3.2 | 16.8 |

The required amount of sulfoethylmethacrylate for each sample was first converted to its ammonium salt in ice water by reaction with an excess of ammonium hydroxide. The excess ammonium hydroxide and reaction water were removed by vacuum distillation. The required amount of acrylic acid to bring the monomer mixture for each sample up to 20 grams was added and the monomers were diluted with 16 milliliters of methanol and 30 milliliters of isopropyl alcohol. Bis-azobutyronitrile in the amount of 0.3 grams was added as a free radical catalyst. Polymerization reaction was carried out under a reflux condensor for 2 hours with sufficient heat being provided to keep the reaction mixture at a simmer. The reaction product was purified by reprecipitating three times in a benzene/methanol system and then subsequently heated for 24 hours at 80°C. to remove final traces of solvent and catalyst materials.

Grafting on of Low Polar Groups

A forty weight percent solution of the acrylic acid/sulfoethylmethacrylate ammonium salt copolymer was prepared for each of samples 11–15. 18 grams, containing 7.2 grams of the polymer, was reacted with glycidylmethacrylate in the manner described in Example 1. To accelerate the reaction, .5 percent of diethylbenzylamine based on the weight of glycidylmethacrylate, was employed. The resulting polymer was purified three times by reprecipitation in a benzene/methanol system and the resultant purified polymer was dissolved in n-butanol. The sulfonic groups were returned their acid form by passing the polymer/butanol solution through a column containing a strong acid cation exchange resin.

Additional n-butanol was added to adjust polymer concentration of the primer to about 2 weight percent.

Each of the primer compositions containing samples 11–15 were tested for adhesion improvement properties on bovine teeth according to Example II. The results are set forth in Table C below:

| Sample | Tensile Strength kg/cm$^2$ |
|---|---|
| 11 | 191.8 |
| 12 | 191.6 |
| 13 | 182.9 |
| 14 | 171.3 |
| 15 | 143.2 |

The results set forth above cover the average of 10 specimens as in Example II.

EXAMPLE V

The following example illustrates the preparation and testing of a primer composition in accordance with this invention where the surface reactive group is an amide.

Into 100 ml. of methyl alcohol were charged 45 grams of acrylic acid and 5 grams acrylamide. Bis-isobutylnitrile in the amount of 0.5 grams was added as a reaction initiator. The reaction mixture was held at a simmer under a reflux condensor until polymerization was substantially complete. The reaction copolymer was reprecipitated three times in a benzene/methanol system and the resulting polymer was further heated for 48 hours at 80°C to remove traces of solvent and initiator.

7.2 grams of the copolymer were in methanol and to this solution 14.2 grams of glycidylmethacrylate and 0.07 grams diethylaniline were added. The resulting solution was held at 50°C. until the polymerization reaction was substantially complete, in this case about 24 hours. The resulting copolymer was reprecipitated three times from a benzene/methanol system and the purified copolymer was made up to a 2 percent solution in n-butanol to produce a primer composition for testing.

The primer composition was applied and tested in accordance with the procedure set forth in Example II. The average tensile strength for five samples was 173.1 kg/cm$^2$.

It should be clear from the above description that the invention is not predicated upon a particular combination of monomers, solvents or restorative materials; the essence of the invention residing in the improved adhesion between metal ion containing substrates and restorative materials when a polymeric composition containing both polar, hydrophillic surface active groups and low polar hydrophobic reactive groups capable of polymerization with the restorative material is applied as a primer to a substrate surface to which the restorative material is to be bonded. The choice of the particular reactive groups to be employed in the polymeric composition depends on the nature of the substrate, the environment in which the restoration is to be used and the nature of the restorative material. Thus, while the invention has been described and illustrated herewith, with reference to certain preferred embodiments thereof, it is to be understood that it may be otherwise embodied within the scope of the appended claims.

I claim:

1. A primer to improve the adherence of a free radical polymerized dental restorative material comprising a polar low aliphatic alcohol liquid solvent having a boiling point between about 50°C and 150°C and containing in solution a polymeric composition characterized by containing high polar, hydrophillic surface active groups and low polar hydrophobic reactive groups, said low polar reactive groups being located in terminal positions in the structure of said polymeric material, said polymeric material being the reaction product of polyacrylic acid and a monomer selected from the group consisting of glycidyl methacrylate and sulfoethylmethacrylate, the mol ratio of said polyacrylic acid to said monomer is between 0.1:1 to about 1:1 on mol weight/mol weight basis.

2. The composition of claim 1 wherein said polymeric composition comprises between about 0.0625 weight percent to about 10 weight percent thereof.

3. The composition of claim 1 wherein said solvent is n-butanol.

* * * * *